United States Patent

[11] 3,612,915

[72] Inventor George J. Frye
Portland, Oreg.
[21] Appl. No. 827,568
[22] Filed May 26, 1969
[45] Patented Oct. 12, 1971
[73] Assignee Tektronix, Inc.
Beaverton, Oreg.

[54] TRIGGERABLE APPARATUS
13 Claims, 3 Drawing Figs.

[52] U.S. Cl. .......... 307/290, 307/258, 307/286
[51] Int. Cl. .......... H03k 17/00, H03k 3/26
[50] Field of Search .......... 307/258, 286, 322, 290

[56] References Cited
UNITED STATES PATENTS

| | | | |
|---|---|---|---|
| 3,150,273 | 9/1964 | Dym | 307/286 |
| 3,302,036 | 1/1967 | Consentino et al. | 307/286 |
| 3,453,448 | 7/1969 | Close | 307/286 |

*Primary Examiner*—Donald D. Forrer
*Assistant Examiner*—B. P. Davis
*Attorney*—Buckhorn, Blore, Klarquist and Sparkman

ABSTRACT: A Schmitt trigger circuit comprises a tunnel diode in series with a transistor amplifier, with a load resistor shunted across the series combination. The output of the transistor amplifier is coupled in positive feedback relation to the tunnel diode.

GEORGE J. FRYE
*INVENTOR*

*BY*
*BUCKHORN, BLORE, KLARQUIST & SPARKMAN*
*ATTORNEYS*

TRIGGERABLE APPARATUS

BACKGROUND OF THE INVENTION

A relatively fast-acting Schmitt trigger circuit for triggering an oscilloscope, or a similar triggerable device, advantageously comprises a tunnel diode shunted by a load resistor. When input current applied to the combination reaches a given value, the tunnel diode switches from a low voltage state to a high voltage state, and some of the current, theretofore carried by the diode, is then shunted by the parallel resistor. The resistor is chosen to have a value such that the current then remaining in the tunnel diode is just sufficient to prevent the diode from switching back to its low voltage state. The difference between the input current value required for switching the tunnel diode from its low voltage state to its high voltage state, and the current required to switch the tunnel diode from its high voltage state back to its low voltage state, is thereby reduced. This difference is termed the hysteresis range of the device. However, there are limits with respect to the reduction of hysteresis which may be accomplished by a shunt resistance. As a resistance value is reduced, current losses are occasioned in the Schmitt circuit, as a smaller proportion of the current goes into driving the tunnel diode and its capacitance. The resistance has a damping effect and, as a consequence, the circuit becomes slower in speed and is very input signal dependent. Moreover, the net current-voltage characteristic obtained is that of a tunnel diode in parallel with a resistance, and the peak current value occurs at a somewhat higher voltage level than would be the case without the resistance. At the peak current switching threshold, the tunnel diode itself may actually be operating in its negative resistance region. If inductance is present in the lead between the tunnel diode and the parallel resistance, parasitic oscillation is liable to result, especially if the resistance is such as to provide a fairly narrow hysteresis range and if a high quality or fast tunnel diode is employed. Conventional circuits, rather than seeking to narrow the hysteresis range by greatly reducing the parallel resistance in value, instead employ a somewhat larger value of resistance, and the Schmitt circuit is driven with sufficient amplification to compensate for the larger hysteresis range. Unfortunately, this expedient is more expensive, and results in an overall circuit having the frequency limitations of the driving amplifier. It is desired, instead, to reduce the hysteresis range to almost zero without a sacrifice in switching speed, and without employing an additional driving amplifier.

SUMMARY OF THE INVENTION

According to the present invention, a triggerable apparatus comprises a circuit including an input terminal and a tunnel diode coupled thereto and responsive to changes in current supplied at the input terminal for changing voltage states in accordance with known tunnel diode switching characteristics. A load impedance, i.e. a load resistor, is coupled to the input terminal, and the circuit is also provided with positive feedback means for supplying current at the input terminal. The positive feedback means is continuously responsive to changes in current flow in the tunnel diode for correspondingly changing the current supplied such terminal by such positive feedback means.

The positive feedback means amplifies the current applied to the tunnel diode, and thus makes the circuit more sensitive than prior circuits. Moreover, when the input current increases to a value where the tunnel diode switches to its high voltage state, current is shunted to the aforementioned load impedance, and less current flows in the tunnel diode. The positive feedback circuit then further reduces the current supplied to the tunnel diode, so that the tunnel diode is just ready to switch back to its low voltage state. With this circuit, it is possible to reduce the hysteresis range to almost zero without a sacrifice in switching speed. The positive feedback circuit is not required to handle the high speed portions of the tunnel diode pulse, and is somewhat slower acting. Therefore, parasitic oscillations, as sometimes encountered in prior art Schmitt circuit operation, do not occur. Moreover, the load resistance can have a relatively large value, since the narrowing of the hysteresis range is here accomplished largely by the positive feedback circuit. Thus the high speed advantages of a low capacitance tunnel diode can be realized.

It is accordingly an object of the present invention to provide an improved fast acting Schmitt trigger circuit employing a tunnel diode.

It is a further object of the present invention to provide an improved tunnel diode Schmitt trigger circuit wherein the hysteresis range is reduced to a very small amount without a sacrifice in switching speed.

It is a further object of the present invention to provide a highly sensitive tunnel diode Schmitt trigger circuit which is operative up to high frequencies.

It is a further object of the present invention to provide an improved tunnel diode Schmitt trigger circuit having a narrow hysteresis range, wherein undesired oscillation is prevented.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

DETAILED DESCRIPTION

Figure 1:
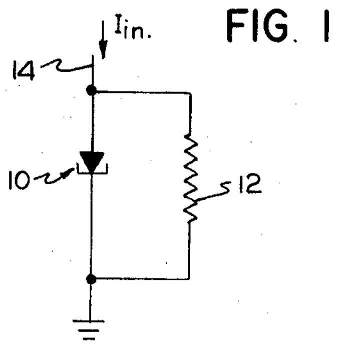
FIG. 1 is a schematic diagram of a prior art tunnel diode Schmitt trigger circuit.

Referring to FIG. 1, a prior art tunnel diode Schmitt trigger circuit includes a tunnel diode 10 having its cathode grounded and its anode connected to lead 14 where an input current $I_{in}$ is provided. The tunnel diode is shunted by a parallel load resistor or swamping resistor 12. As hereinbefore mentioned, the load resistor 12 shunts current when the tunnel diode switches from its low voltage state to its high voltage state, so that a smaller current will then remain flowing through tunnel diode 10. This remaining current is designed to be somewhat greater than the valley current of the tunnel diode, whereby a relatively small reduction in the current $I_{in}$ will switch the tunnel diode back to its low voltage condition. However, the circuit is subject to the aforementioned disadvantages of slow speed and liability to oscillation unless the hysteresis range is actually fairly wide. A driving amplifier is employed to make up for the widened hysteresis range.

Figure 2:
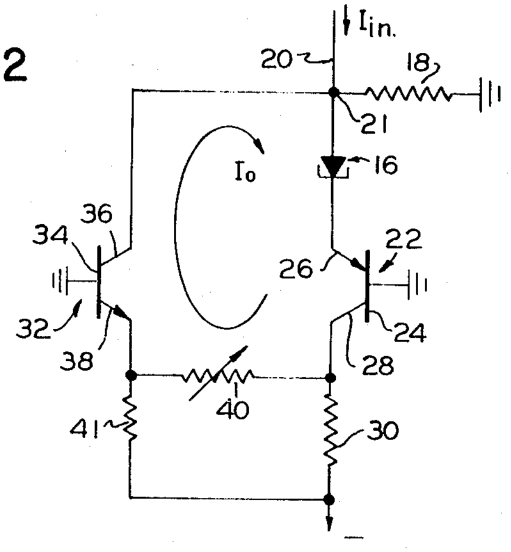
(PRIOR ART) FIG. 2
FIG. 2 is a schematic diagram of a Schmitt trigger circuit according to the present invention.

FIG. 2 illustrates the circuit according to the present invention wherein an input current $I_{in}$ is provided at lead 20 to an input terminal 21, to which is connected the anode of tunnel diode 16. A load impedance comprising resistor 18 is shunted from input terminal 21 to ground. The cathode of tunnel diode 16 is connected to the emitter 26 of a PNP transistor 22, the latter comprising means continuously responsive to current flow in the tunnel diode. The base of transistor 22 is grounded whereby the transistor is connected in a common base amplifier configuration, and the collector 28 is returned to a negative supply voltage through resistor 30. The transistor 22 also forms a positive feedback amplifier, and its output is coupled back to input terminal 21 through feedback coupling means. In the present circuit, this feedback coupling means may be considered as comprising a variable resistor 40 and an NPN transistor 32. The resistor 40 is interposed between the collector 28 of transistor 22 and the emitter 38 of transistor 32, while the base of transistor 32 is grounded whereby the transistor is connected in a common base amplifier configuration. The emitter 38 of transistor 32 is returned to a negative supply voltage through resistor 41, and the collector 36 of transistor 32 is coupled to terminal 21. A small isolating resistor (not shown) may be suitably inserted in the lead between collector 36 and terminal 21.

Under normal operating conditions, before the tunnel diode switches, the feedback circuit comprising transistor 22, as well as transistor 32, amplifies the current $I_{in}$ so that a change in $I_{in}$ (from lead 20) results in an amplified current change being applied to tunnel 16. It can be shown that $I_o$ or the current flowing through tunnel diode 16, as well as through transistor 22, resistor 40, and transistor 32 $=I_{in}(R_{30}/R_{40})$, where $R_{30}$ and $R_{40}$ are the resistances of resistors 30 and 40, respectively. Thus the circuit operates in a positive feedback mode to enhance the sensitivity of the tunnel diode to changes in current $I_{in}$. At this time, substantially no current is flowing in load resistor 18, this resistor having a value of approximately 200 ohms in a typical circuit according to the present invention employing a 10 milliampere tunnel diode 16. The load resistor in a typical prior art tunnel diode Schmitt circuit would have a smaller value, e.g. an order of magnitude smaller. The anode of the tunnel diode is thus connected to a comparatively high impedance point.

As will be appreciated, the load resistor 18, driven from a current source via lead 20, may be replaced by a voltage source and a corresponding resistance in series therewith.

By comparison to resistor 18, the tunnel diode appears substantially as a short circuit in its low voltage state, and moreover, the cathode of the tunnel diode is connected to a low impedance at the emitter 26 of transistor 22. Therefore, the current $I_{in}$ supplied at this time will flow substantially entirely through the tunnel diode 16 and transistor 22. Since the current $I_{in}$ flows through transistor 22, transistor 22 is substantially continuously responsive to changes therein.

The circuit employing the common base connected transistors 22 and 32 responds more rapidly than a transistor amplifier circuit employing a common emitter configuration, for example. Thus, when a current is inserted at the emitter of transistor 22, the same current very quickly appears at the collector, the two elements forming a part of substantially the same current flow path. Operation of transistors 22 and 32, although quite fast, is, of course, slower than the speed of response of the tunnel diode.

Figure 3:
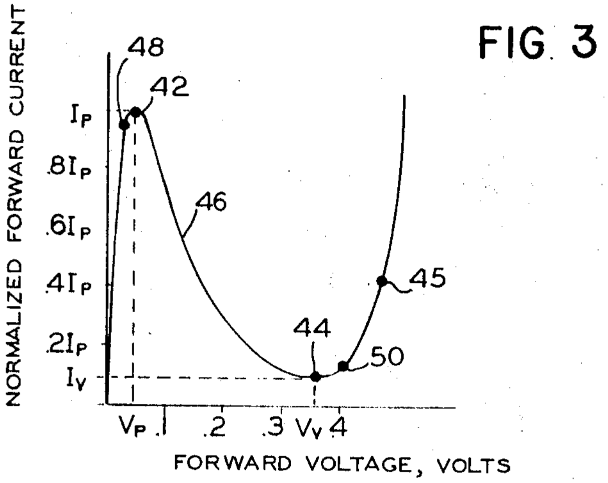
FIG. 3 is a tunnel diode characteristic curve illustrating operation of the FIG. 2 circuit.

Consideration of the switching action of the tunnel diode will be aided by reference to FIG. 3, illustrating a typical tunnel diode characteristic curve. When the current $I_{in}$ reaches the peak value, $I_p$ at point 42 on the curve, the tunnel diode very rapidly switches to a high voltage state. Such high voltage state may be initially indicated by point 45 on the characteristic curve. The voltage across the tunnel diode is now higher than voltage values characterizing the negative resistance region 46 of the curve, and higher than the valley voltage $V_v$ at valley point 44. Switching is quite and the feedback amplifier comprising transistors 22 and 32 does not amplify the change as rapidly. However, the current at point 45 is lower than the current theretofore flowing through tunnel diode 16, and transistor 22, by virtue of the current shunted through resistor 18. Therefore, substantially immediately after tunnel diode switching has taken place, the feedback circuit will additionally reduce the current in tunnel diode 16. The resulting current in tunnel diode 16, $I_o'=(I_{in}+\Delta I_{in}-I_{18})(R_{30}/R_{40})$, where $I_{18}$ is the current in resistor 18, and $\Delta I_{in}$ is the increase in $I_{in}$ that produced switching. As a consequence, the current in the tunnel diode will be lowered so that tunnel diode operation may now be described, for example, by point 50 on the characteristic curve. The feedback action takes place rapidly enough to narrow the hysteresis range, but slowly enough so that undesired parasitic oscillation does not take place. Since the positive feedback circuit is employed, load resistor 18 need not be so small as to incur the disadvantages hereinbefore described for a smaller load resistor. Circuit output may be taken via a small capacitor (not shown) coupling terminal 21 to a transmission line or the like.

The quiescent or nonsignal value of $I_{in}$ can be adjusted, and variable resistor 40 can be adjusted, so that the resulting current $I_o$ in the tunnel diode is quite near the peak current, $I_p$ for the tunnel diode. For example, the quiescent value of $I_o$ may be adjusted so that operation of the tunnel diode is initially described by point 48 on the tunnel diode characteristic curve, whereby a small increase in $I_{in}$ would then switch the tunnel diode to its high-voltage state. In addition, the adjustment of resistor 40 can also be such that the value of $I_o'$, when the tunnel diode is in a high voltage state, is just above the valley current, e.g. as indicated at point 50 in the FIG. 3 curve. Only a small decrease in $I_{in}$ is then required to switch the tunnel diode back to its low voltage state. The hysteresis range for the device can be made quite small without impairing speed of operation or causing instability in the circuit. The circuit components, both active and passive, which cause the tunnel diode to be biased so that it will act in a Schmitt mode, are not required to handle the high speed portions of a relatively low repetition rate pulse, for example, so that very low jitter trigger recognition is possible when a high speed tunnel diode is used.

The circuit according to the present invention is capable of Schmitt operation at low signal levels, e.g. of 5 millivolts at an impedance level of 50 ohms. It can provide Schmitt operation in the range of 50 to 100 megahertz, and, of course, also at lower frequencies. The present circuit may alternatively be adjusted so that point 50 is "lower" than valley point 44, and therefore the circuit may be made to oscillate. This adjustment can again be made by means of variable resistor 40 in order to provide a current $I_o'$ which is less than $I_v$. The frequency of oscillation will be dependent upon the speed of response of the amplifier comprising transistors 22 and 32. The circuit typically free runs between 50 and 100 megahertz, and will synchronize on a signal supplied via lead 20 having a frequency well above a gigaHertz. Thus, the tunnel diode is responsive to signals which are quite high in frequency, and which can be used to provide synchronization of the more slowly operating overall circuit including transistors 22 and 32. Although oscillation is made possible by selectively adjusting the value of resistor 40, controlled Schmitt operation is preferred according to the present invention, with the tunnel diode providing high frequency response to input signals.

While I have shown and described a preferred embodiment of my invention, it will be apparent to those skilled in the art that many changes and modifications may be made without departing from my invention in its broader aspects.

I claim:

1. Triggerable apparatus adapted to provide a rapid change in voltage when an input current reaches a given value, and characterized by a narrow hysteresis range, comprising:

a circuit including an input terminal at which said input current is received and a tunnel diode responsive to changes in current flowing to said input terminal for changing voltage states in accordance with tunnel diode switching characteristics, and a load impedance coupled to said input terminal, said circuit being provided with positive feedback means also supplying current to said input terminal and continuously responsive to current flow in said tunnel diode for changing current supplied at said input terminal by increasing the current supplied when the current in the tunnel diode increases and by decreasing the current supplied when the current in the tunnel diode decreases, wherein the positive feedback means normally amplifies changes in input current, and operates to reduce current in said tunnel diode in response to said tunnel diode's changing voltage states from its low voltage state to its high voltage state whereby to reduce the hysteresis range of the apparatus.

2. The apparatus according to claim 1 wherein said positive feedback means comprises a transistor in series with said tunnel diode and coupled to apply its output at said input terminal.

3. The apparatus according to claim 2 including a second transistor coupled between the output of the first mentioned transistor and said input terminal.

4. The apparatus according to claim 3 wherein each of said transistors is connected in a common base amplifier configuration.

5. Triggerable apparatus adapted to provide a rapid change in voltage when an input current reaches a given value, and characterized by a narrow hysteresis range, comprising:

a circuit including an input terminal, a tunnel diode responsive to changes in current flowing to said input terminal for changing voltage states in accordance with tunnel diode switching characteristics, and means in series with said tunnel diode responsive to current flow therein, a load impedance in shunt relation with said circuit, and means coupling said means in series with said tunnel diode in positive feedback relation to said input terminal.

6. The apparatus according to claim 5 wherein said coupling means as well as said means in series with said tunnel diode comprise common base connected transistors.

7. The apparatus according to claim 6 wherein the transistor comprising the means in series with the tunnel diode is disposed in series therewith on the opposite side thereof from said input terminal, and further including a first impedance returning the output of the last mentioned transistor to a source of reference potential, wherein the transistor comprising the coupling means has its output coupled to said input terminal, and also further including a second impedance disposed between the input of the last mentioned transistor and the junction between the first impedance and the output of the transistor in series with the tunnel diode.

8. Triggerable apparatus adapted to provide a rapid change in voltage when an input current reaches a given value, and characterized by a narrow hysteresis range, comprising:

a circuit including an input terminal and a tunnel diode responsive to changes in current flowing to said input terminal for changing states in accordance with tunnel diode switching characteristics, a load resistance coupled to said input terminal, and positive feedback means coupled to said tunnel diode for normally and continuously increasing the amplitude of current changes as appear at said input terminal.

9. Triggerable apparatus adapted to provide a rapid change in voltage when an input current reaches a given value, and characterized by a narrow hysteresis range, comprising:

an input terminal for receiving said input current, a load resistance shunting said input terminal to a point of common reference potential, a tunnel diode having one terminal connected to said input terminal, a transistor having its emitter coupled to the second terminal of said diode and its base coupled to a point of reference potential, impedance means coupling the collector of said transistor to a point of reference potential, and feedback coupling means disposed between the collector of said transistor and said input terminal.

10. The apparatus according to claim 9 wherein said feedback coupling means comprises a second transistor having its collector coupled to said input terminal and its base coupled to a reference point, and also including impedance means coupling the emitter of said second transistor to the collector of the first mentioned transistor.

11. The apparatus according to claim 10 where both the first mentioned impedance and the second impedance are resistors.

12. The apparatus according to claim 10 wherein the first mentioned transistor is a PNP-type, and the second transistor is an NPN-type.

13. Triggerable apparatus adapted to provide a rapid change in voltage when an input current reaches a given value, and characterized by a narrow hysteresis range, comprising:

an input terminal for receiving said input current, a load resistance shunting said input terminal to a point of common reference potential, a tunnel diode having one terminal connected to said input terminal, a transistor having its emitter coupled to the second terminal of said diode and its base coupled to a point of reference potential, and feedback coupling means disposed between the collector of said transistor and said input terminal.

PO-1050
(5/69)

UNITED STATES PATENT OFFICE
CERTIFICATE OF CORRECTION

Patent No. 3,612,915 Dated October 12, 1971

Inventor(s) GEORGE J. FRYE

It is certified that error appears in the above-identified patent and that said Letters Patent are hereby corrected as shown below:

Col. 3, line 9, after "tunnel" insert --diode--

Col. 3, line 52, after "quite" insert --rapid--

Signed and sealed this 11th day of April 1972.

(SEAL)
Attest:

EDWARD M.FLETCHER,JR.
Attesting Officer

ROBERT GOTTSCHALK
Commissioner of Patents